United States Patent
Wayte et al.

(10) Patent No.: US 7,249,412 B2
(45) Date of Patent: Jul. 31, 2007

(54) METHOD FOR REPAIRING A DAMAGED BLADE OF A BLISK

(75) Inventors: Peter Wayte, Maineville, OH (US); Thomas Froats Broderick, Springboro, OH (US)

(73) Assignee: General Electric Company, Schenectady, NY (US)

(*) Notice: Subject to any disclaimer, the term of this patent is extended or adjusted under 35 U.S.C. 154(b) by 504 days.

(21) Appl. No.: 10/853,050

(22) Filed: May 25, 2004

(65) Prior Publication Data

US 2005/0274008 A1    Dec. 15, 2005

(51) Int. Cl.
B23P 6/00 (2006.01)
B23K 9/04 (2006.01)

(52) U.S. Cl. ............... 29/889.1; 29/402.13; 29/402.16; 29/402.18

(58) Field of Classification Search ............... 29/592, 29/889, 402.01, 402.18, 402.19, 889.1, 402.2, 29/402.03, 402.04–402.11, 402.13, 402.16, 29/403.1–403.4; 228/119, 19
See application file for complete search history.

(56) References Cited

U.S. PATENT DOCUMENTS

| | | | | |
|---|---|---|---|---|
| 4,762,266 A | * | 8/1988 | Schroder et al. ............ 228/103 |
| 4,842,652 A | | 6/1989 | Smith et al. | |
| 4,873,751 A | * | 10/1989 | Walker et al. ............. 29/889.1 |
| 6,172,327 B1 | * | 1/2001 | Aleshin et al. ........ 219/121.64 |
| 6,326,585 B1 | * | 12/2001 | Aleshin et al. ........ 219/121.63 |
| 6,326,858 B1 | * | 12/2001 | Strnad .................... 331/107 R |
| 6,536,110 B2 | * | 3/2003 | Smith et al. ............. 29/889.21 |
| 6,568,077 B1 | * | 5/2003 | Hellemann et al. ........ 29/889.1 |
| 2002/0195176 A1 | * | 12/2002 | Smith et al. ................ 148/526 |

* cited by examiner

Primary Examiner—David P. Bryant
Assistant Examiner—Steven F. S. Beam
(74) Attorney, Agent, or Firm—McNees Wallace & Nurick LLC

(57) ABSTRACT

A BLISK having a damaged blade, with a repair region that has a thickness less than a specified thickness as a result of damage during manufacture or prior service, is repaired by depositing repair metal onto the repair region to increase its thickness to greater than its specified thickness dimension. Only the repair region is stress relieved by heating the repair region to a stress-relieving temperature of from about 1150° F. to about 1250° F. for a time of at least about 1 hour. The intentional manipulation of microstructure in only the thinner airfoil sections allows multiple repairs, which are not possible in the thicker sections of the BLISK. An alpha-case thickness of repair metal, preferably of at least about 0.0002 inches of repair metal, is removed from a surface of the repair region.

18 Claims, 3 Drawing Sheets

METHOD FOR REPAIRING A DAMAGED BLADE OF A BLISK

This invention relates to a repair procedure for a BLISK in which an airfoil has been damaged and, more particularly, to a titanium-alloy BLISK in which the repair procedure restricts the formation of alpha case to the repaired region and thus does not affect the dimensions of the non-repaired locations of the BLISK.

BACKGROUND OF THE INVENTION

In an aircraft gas turbine (et) engine, air is drawn into the front of the engine, compressed by a shaft-mounted compressor, and mixed with fuel. The mixture is combusted, and the resulting hot combustion gases are passed through a turbine mounted on the same shaft. The flow of gas turns the turbine by contacting an airfoil portion of the turbine blade, which turns the shaft and provides power to the compressor. The hot exhaust gases flow from the back of the engine, driving it and the aircraft forward. There may additionally be a bypass fan that forces air around the center core of the engine, driven by a shaft extending from the turbine section.

The compressor, the turbine, and the bypass fan have a similar construction. They each have a rotor assembly including a rotor disk and a set of blades extending radially outwardly from the rotor disk. The compressor, the turbine, and the bypass fan share this basic configuration. However, the materials of construction of the rotor disks and the blades, as well as the shapes and sizes of the rotor disks and the blades, vary in these different sections of the gas turbine engine. The blades may be integral with and metallurgically bonded to the disk, forming a BLISK ("bladed disk", also sometimes known as an "integrally bladed rotor" or IBR), or they may be mechanically attached to the disk.

During manufacture or service, one (or more) of the blades of the BLISK may be damaged, as for example by the impact of particles entrained in the gas flow that impinges on the blade. If the damage is sufficiently severe so that the location on the blade is below its minimum specified thickness, the blade must be repaired. In the repair, the damaged area is built up with a metallic deposit. The BLISK is then heat treated to relieve residual stresses. The repair process heats the BLISK and causes the formation of an oxygen-enriched, reduced-ductility alpha case in titanium-alloy BLISKs. The alpha case must be removed, typically by etching. If the blades of the BLISK are repaired multiple times, the disk may be etched so many times that other portions of the BLISK are reduced below their minimum dimensions. Repeated repairs are therefore not possible.

There is therefore a need for an approach that permits BLISKs to be repaired multiple times, without significant degradation in properties and without a reduction in dimensions to below the minimum specified values. The present invention fulfills this need, and further provides related advantages.

SUMMARY OF THE INVENTION

The present invention provides a method for repairing a damaged BLISK, and specifically a damaged blade of a BLISK. The damage may occur during manufacture or prior service. The performance of the BLISK is not reduced as a result of the repair. This approach allows the blades of the BLISK to be repaired multiple times, without loss of the functionality of the BLISK due to an excessive reduction in its dimensions in the non-repaired regions to below the minimum specified values.

A method for repairing a BLISK includes furnishing the BLISK having a damaged blade with a repair region that has a thickness of less than a specified thickness as a result of damage during manufacture or prior service. The BLISK, and specifically the blade being repaired, is preferably made of a beta-processed titanium-alloy such as Ti-17 or Ti-6242.

Repair metal is thereafter deposited onto the repair region to increase its thickness to greater than its specified thickness dimension. The repair metal is preferably of the same composition as the base metal of the blade, but it may be of a different composition. The repair metal is preferably deposited by welding or by a metal thermal spray technique.

The method further includes thereafter stress relieving and modifying the microstructure in the repair region to a more damage-tolerant condition by heating the repair region to a temperature of about 1150° F. to about 1250° F. for a time of at least 1 hour. The combination of temperature and time is important to achieve both a local stress relieve and a microstructural change. The heating step preferably is performed by applying a local heat source overlying only the repair region and is preferably performed in air or inert gas followed by air cooling.

Thereafter, an alpha-case thickness of repair metal of at least about 0.0002 inches of repair metal is removed from a surface of the repair region. The alpha-case removal process is preferably accomplished by local chemical etching of the repaired portion of the blade and the material immediately adjacent to the repair that is subjected to the localized heat treatment. During the chemical etching, the repaired blade is preferably moved vertically (up and down) in the etching solution to prevent the formation of a shoulder or step. It is preferred that only the area being repaired is etched in the local chemical etching, so as not to reduce the dimensions of the remainder of the BLISK to less than the acceptable dimensions.

The present approach is particularly suitable for sequentially performing multiple repairs on damaged blades of the BLISK. The BLISK may therefore be furnished wherein the damaged blade, or another blade, has been repaired at least one prior time. After repair, the BLISK is typically returned to service, and thereafter the same damaged blade, or another blade, may be repaired at least one additional time by the steps of depositing, stress relieving, and removing of excess deposited material and alpha case.

This local heat-treating approach is distinct from an approach, not within the scope of the invention, where the entire BLISK is heat treated. Conducting the heat treatment on the entire BLISK would degrade the properties in the thick sections of the non-repaired portions of the BLISK, such as the bore of the BLISK. As the airfoils have thinner sections and different property requirements than the bore, the heat treatment of the present approach may be conducted multiple times, on the same damaged blade or different damaged blades, and still allow repaired airfoils and the thick portion of the disk near the center bore to have acceptable properties.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
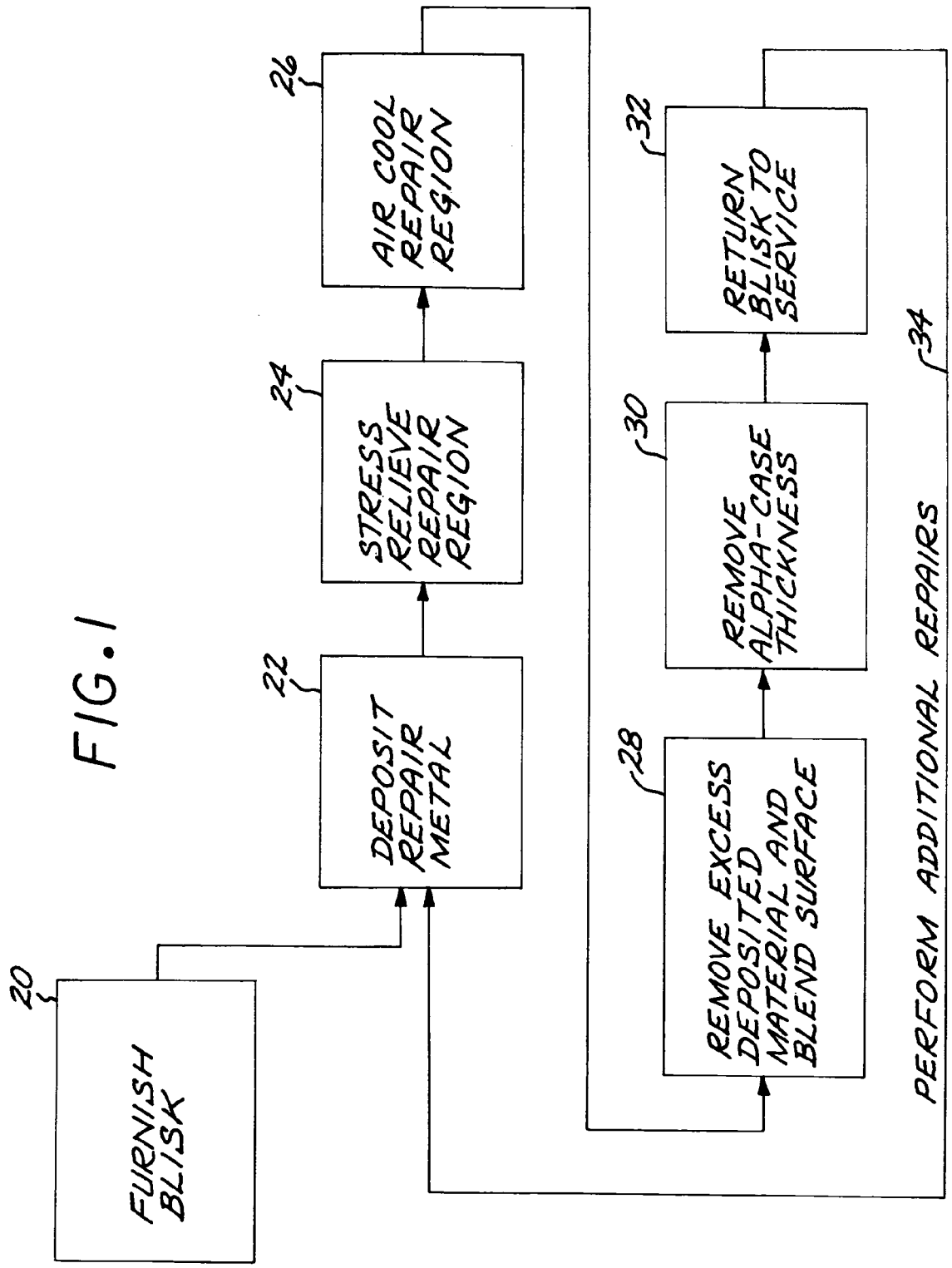
FIG. 1 is a block diagram of a method for practicing an embodiment of the invention.
Figure 2:
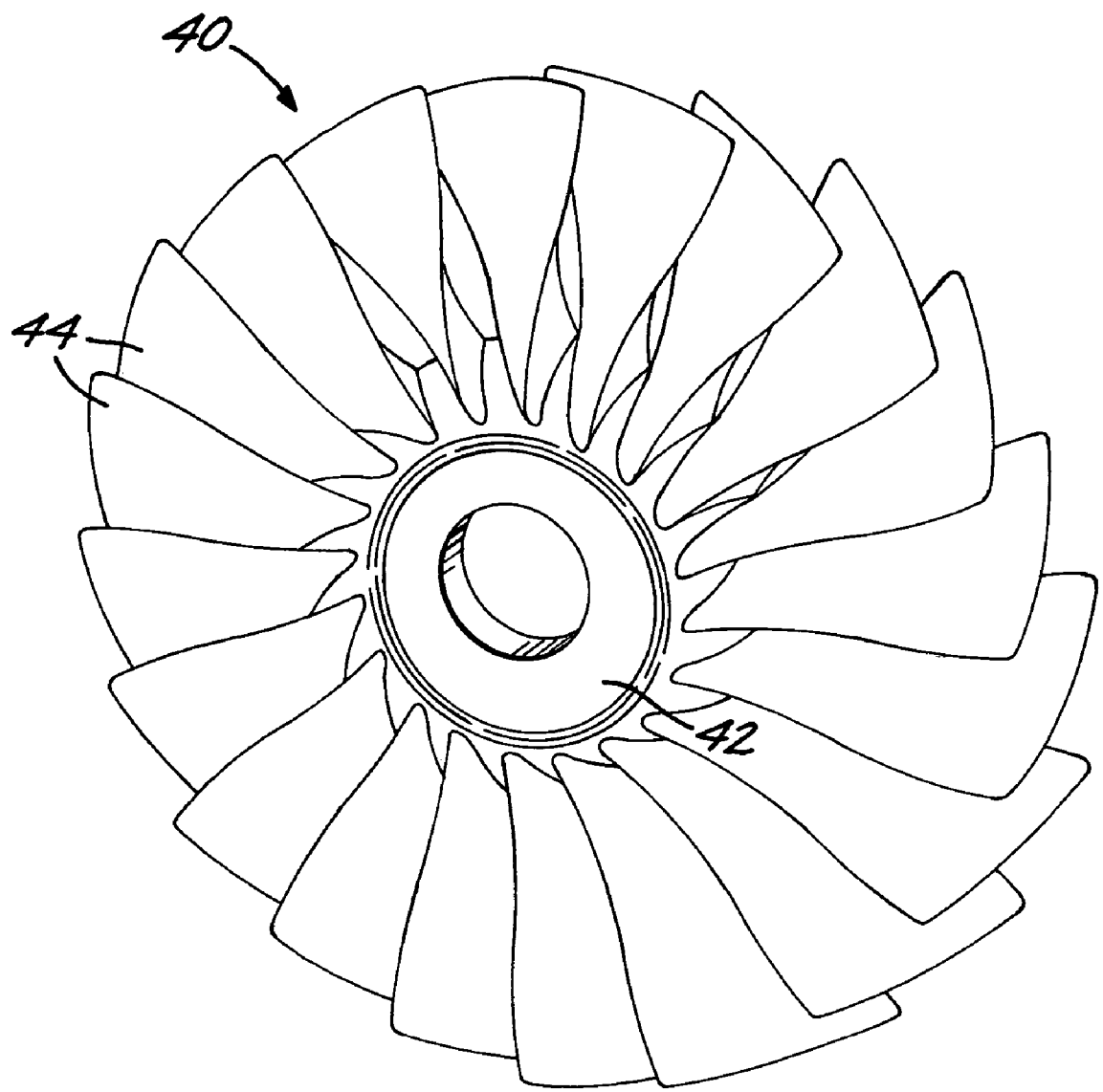
FIG. 2 is a perspective view of a BLISK.

FIG. 1 illustrates in block diagram form an embodiment of a method for repairing a BLISK. The method includes furnishing a BLISK 40, step 20. FIG. 2 illustrates such a BLISK 40. "BLISK" is a term of art that is a contraction of the term "bladed disk", which is also sometimes called an integrally bladed rotor or IBR. The BLISK 40 includes a thick-section central disk 42 and a plurality of compressor or turbine blades 44 that are prepared integrally with or metallurgically bonded to the disk 42. The BLISK 40 may be made of any operable material. The disk 42 and the blades 44 may be of the same material or of a different material. In a case of most interest, the entire BLISK 40, including both the disk 42 and the blades 44, are made of a beta-processed titanium-alloy such has Ti-17, having a nominal composition in weight percent of Ti-5Al-4Mo-4Cr-2Sn-2Zr, or Ti-6242, having a nominal composition in weight percent of Ti-6Al-2Sn-4Zr-2Mo.

Figure 3:
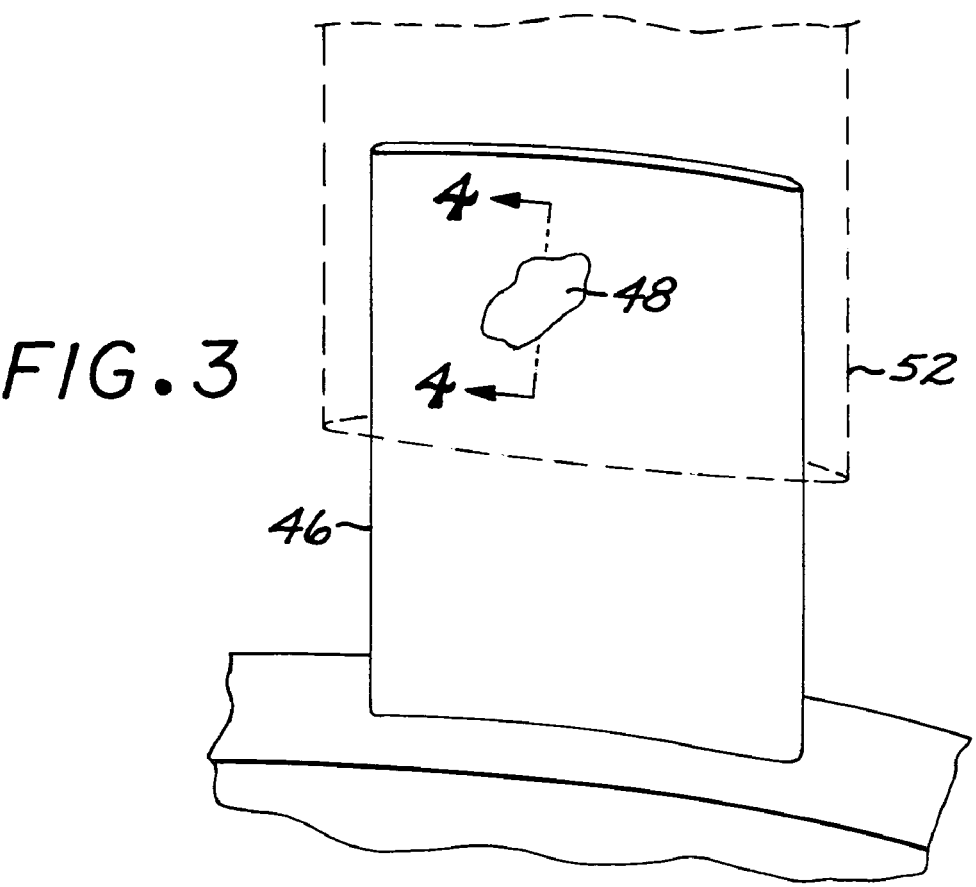
FIG. 3 is a detail of a blade of a BLISK undergoing repair.
Figure 4:
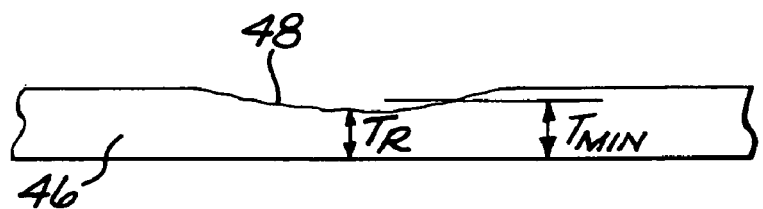
FIG. 4 is a sectional view through the blade of FIG. 3 taken along line 4—4, prior to repair.
Figure 5:
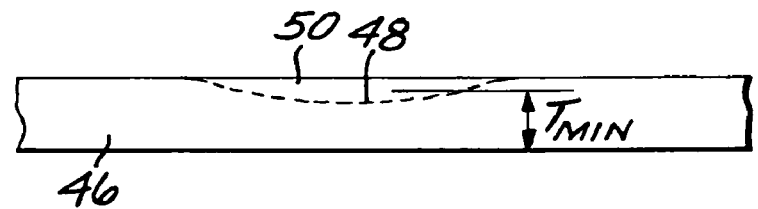
FIG. 5 is a sectional view through the blade of FIG. 3 taken along line 4—4, after repair.

The as-furnished BLISK 40 has at least one damaged blade 46, seen in FIGS. 3–5, and may have more than one damaged blade. The illustrated damage is in the form of a repair region 48 where metal has been removed during service to a local thickness $T_R$ (FIG. 4) that is less than a minimum specified thickness $T_{MIN}$ as a result of the damage during manufacture or prior service. The removal of metal to produce the repair region 48 may occur due to any of a number of factors, such as erosion, corrosion, impact damage, tip rubbing, and the like during service. $T_{MIN}$ is a value established by the engine designers as the minimum thickness of the blades 44 that will provide the required mechanical performance, and is set forth in the specification for the blades 44. The value of $T_{MIN}$ is not established as part of the present approach, and is an input number. The BLISK 40 may have been previously repaired, either in the repair region 48, another region of the damaged blade 46, or on another blade 44, or it may not have been previously repaired. A virtue of the present approach is that it allows the damaged blades of the BLISK 40 to be repaired multiple times.

Prior to conducting the repair, the repair region 48 is cleaned, as needed, by aqueous cleaners and/or by solvents, and then dried.

Repair metal 50 is thereafter deposited onto the repair region 48 to increase its thickness to greater than its specified minimum thickness dimension $T_{MIN}$, step 22, as shown in FIG. 5. The deposition 22 is accomplished by any operable approach, but is typically accomplished by welding or by a thermal spray process. The repair metal 50 may be of the same chemical composition as the damaged blade 46, or a different composition.

After the deposition step 22, only the repair region 48, including the just-deposited repair metal 50, is stress relieved by heating the repair region to a stress-relieving temperature of from about 1150° F. to about 1250° F. for a time of at least about 1 hour, preferably about 2 hours, step 24. FIG. 3 illustrates the stress relieving of "only the repair region 48". A local heating device, such as a heating blanket 52, is placed over the repair region 48 and as small a part of the remainder of the blade 46 as practical. Other types of local heating devices such as ovens and heat lamps may be used instead of the heating blanket 52. The stress relieving 24 is preferably accomplished in air or in an inert gas such as argon. After stress relieving 24, the heat material is preferably air cooled to room temperature, step 26.

Following the stress relieving step 24 and air cooling 26 (where used), any excess deposited material is mechanically removed as needed, and the repaired area and adjacent surfaces are blended to form a smooth surface that meets part configuration requirements, step 28. (This mechanical removal and blending step may instead be performed after subsequently described step 30, as appropriate.)

The stress relieving 24 is performed locally because of the alpha case that forms when some titanium alloys are heat treated at a sufficiently high temperature and for a sufficiently long time in the presence of oxygen gas. The result is an alpha-embrittled zone of oxygen-enriched alpha phase that is generally termed an "alpha case". The alpha case is deleterious to the subsequent use of the article in some applications, because it has reduced ductility and fatigue resistance and increased susceptibility to impact damage, as compared with the underlying alpha-beta or other microstructure. When an alpha case is formed at the surface of a titanium-alloy gas turbine blade, for example, it becomes susceptible to fatigue failure and also to impact failure by foreign objects ingested into the compressor.

The embrittled alpha case is preferably removed, preferably by acid etching. However, if the entire BLISK 40 is stress relieved in step 24 and then acid etched (which is not-within the scope of the present approach), the thickness of the BLISK 40 is uniformly reduced by the thickness of the alpha case that is removed. After several repair procedures of this type on various ones of the damaged blades, the dimensions of the BLISK 40 and particularly the non-repaired blades 44 are reduced below their minimum specified dimensions, so that the BLISK 40 becomes unusable. Consequently, the BLISK 40 is repairable only once or at most a few times when the conventional methodology is used, wherein the entire BLISK 40 is heat treated.

The present approach avoids this problem, and allows multiple repairs of the BLISK 40, by confining the stress relieving and material removal to the repair region 48. Alpha case forms only in the repair region 48 and closely adjacent areas of the same blade 44, because the stress relief step 24 is performed only on the repair region 48 and the closely adjacent areas. An alpha-case thickness of repair metal 50, typically at least about 0.0002 inches of repair metal 50 and more preferably about 0.0004 inches of repair metal 50, is removed from a surface of the repair region 46, step 30. Preferably, only the repair region is etched, and other blades 44 not currently undergoing repair and the thick section of the disk 42 near the central bore are not etched. The removal is preferably accomplished by etching in a nitric-acid-and-acid-fluoride solution. Nitric acid must be present in this preferred approach for metal removal to prevent intrusion of hydrogen into the titanium airfoil. It is preferred that the local area from which metal removal is being accomplished be moved upwardly and downwardly in the etching solution to ensure that no step shoulder is formed at a line junction between the etched and unetched regions, as would be the case if the blade 46 were held stationary at constant depth in the etching solution. Areas, which are not to be etched, may either be kept above the level of the acid etchant, or masked to prevent contact by the etchant.

The result of the combination of the localized stress relieving heat treatment and the localized etching of the damaged blade 46 is that the repair of the repair region 48 of the damaged blade 46 is performed, without forming an alpha case in the remainder of the BLISK 40 and without leaving an alpha case on the repaired region. Further, the thicknesses of the various regions of the BLISK 40 are not reduced from their pre-repair values, so that there is no reduction in thickness that would potentially, after one or several repairs, reduce the thicknesses to less than the minimum specified values. Repeated repairs of various parts of the BLISK 40 may therefore be performed without reducing the overall capability of the BLISK 40.

After the alpha-case removal of step 28, the BLISK 40 is typically returned to service, step 32. If, at a later time, the same or another of the blades 44 is damaged and repair is necessary, additional repairs may be performed on the same damaged blade or a different damaged blade, step 34, by the steps of depositing 22, stress relieving 24, optionally air cooling 26, removing 28, and removing 30, as described above. This service/repair cycle may be repeated as many times as may be necessary, on the same or different damaged blades 44. Repeated repairs are possible because the dimensions of the BLISK 40 are not reduced in each successive repair cycle.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for repairing a BLISK, comprising the steps of
   furnishing a BLISK having a damaged blade with a repair region that has a thickness less than a specified thickness as a result of damage during manufacture or prior service; thereafter
   depositing repair metal onto the repair region to increase its thickness to greater than its specified thickness dimension; thereafter
   stress relieving only the repair region by heating the repair region to a stress-relieving temperature of from about 1150° F. to about 1250° F. for a time of at least about 1 hour; and thereafter
   removing an alpha-case thickness of repair metal from a surface of the repair region.

2. The method of claim 1, wherein the step of furnishing the BLISK includes the step of
   furnishing a beta-processed titanium-alloy BLISK.

3. The method of claim 1, wherein the step of furnishing includes the step of
   furnishing the BLISK wherein the damaged blade has been repaired at least one prior time.

4. The method of claim 1, wherein the step of depositing includes the step of
   depositing repair metal by welding.

5. The method of claim 1, wherein the step of depositing includes the step of
   depositing repair metal by thermal spray.

6. The method of claim 1, wherein the step of stress relieving includes the step of
   applying a local heater overlying only the repair region.

7. The method of claim 1, wherein the step of stress relieving includes the step of
   stress relieving the repair region in air.

8. The method of claim 1, including an additional step, after the step of stress relieving and before the step of removing, of
   air cooling the repair region from the stress-relieving temperature to room temperature.

9. The method of claim 1, wherein the step of removing includes the step of
   removing the alpha-case thickness by chemical etching.

10. The method of claim 1, wherein the step of removing includes the step of
    removing the alpha-case thickness of repair metal of at least about 0.0002 inches of repair metal from the surface of the repair region.

11. The method of claim 1, including additional steps, after the step of removing,
    returning the BLISK to service, and thereafter
    repairing the same or another damaged blade by the steps of depositing, stress relieving, and removing.

12. A method for repairing a BLISK, comprising the steps of
    furnishing a BLISK having a damaged blade with a repair region that has a thickness less than a specified thickness as a result of damage during manufacture or prior service; thereafter
    depositing repair metal onto the repair region to increase its thickness to greater than its specified thickness dimension by welding or thermal spray; thereafter
    stress relieving only the repair region by heating the repair region to a stress-relieving temperature of from about 1150° F. to about 1250° F. for a time of at least about 1 hour; thereafter
    removing an alpha-case thickness of repair metal of at least about 0.0002 inches of repair metal from a surface of the repair region; thereafter
    returning the BLISK to service, and thereafter
    repairing the same or another damaged blade by the steps of depositing, stress relieving, and removing.

13. The method of claim 12, wherein the step of furnishing the BLISK includes the step of
    furnishing a beta-processed titanium-alloy BLISK.

14. The method of claim 12, wherein the step of stress relieving includes the step of
    applying a local heater overlying only the repair region.

15. The method of claim 12, wherein the step of stress relieving includes the step of
    stress relieving the repair region in air.

16. The method of claim 12, wherein the step of removing includes the step of
    removing the alpha-case thickness by chemical etching.

17. The method of claim 12, wherein the step of removing includes the step of
    removing about 0.0002 inches of repair metal from the surface of the repair region.

18. The method of claim 12, including an additional step, after the step of stress relieving and before the step of removing, of
    air cooling the repair region from the stress-relieving temperature to room temperature.

* * * * *